Oct. 23, 1928.
W. L. WRIGHT
1,688,607
MOTION PICTURE APPARATUS
Filed Sept. 15, 1926
2 Sheets-Sheet 1
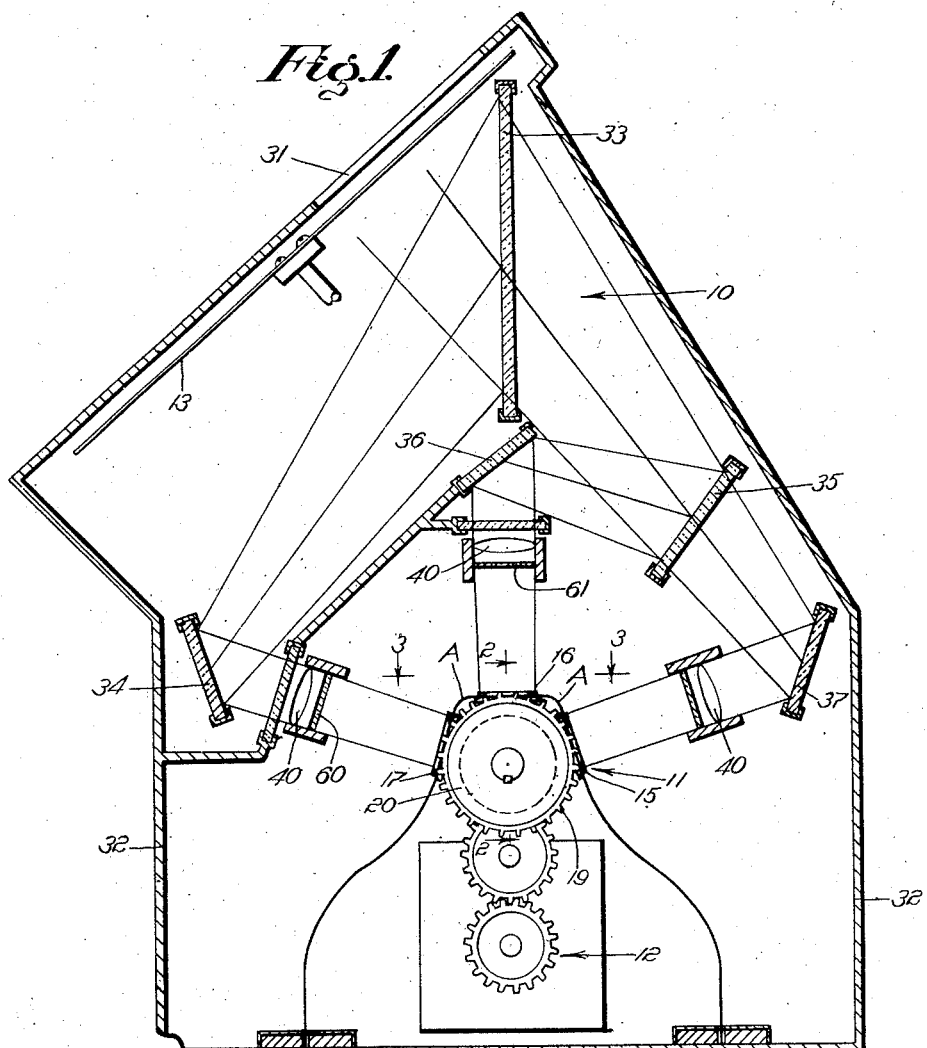
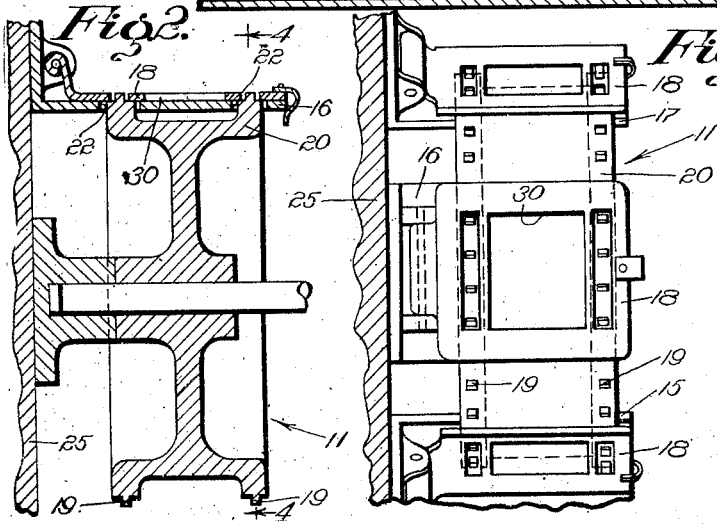
Inventor
Walter L. Wright
by
Attorney Oct. 23, 1928.  
W. L. WRIGHT  
1,688,607  
MOTION PICTURE APPARATUS  
Filed Sept. 15, 1926   2 Sheets-Sheet 2
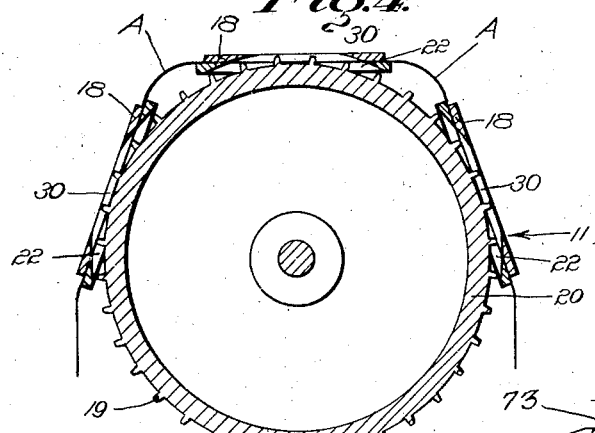
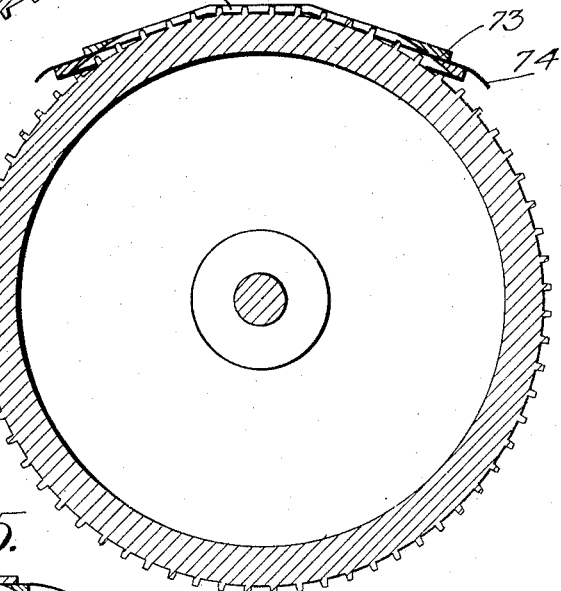
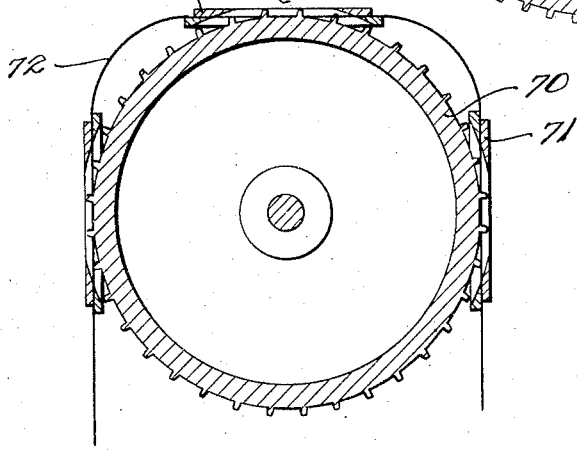
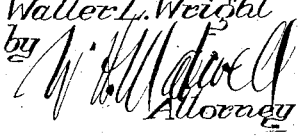
Inventor  
Walter L. Wright Patented Oct. 23, 1928.

1,688,607

UNITED STATES PATENT OFFICE.

WALTER L. WRIGHT, OF SANTA MONICA, CALIFORNIA.

MOTION-PICTURE APPARATUS.

Application filed September 15, 1926. Serial No. 135,524.

This invention has to do with motion picture apparatus and has particular reference to an optical system and a film handling means.

In motion picture photography and particularly in various systems of color photography it is convenient and advantageous to employ the standard form of motion picture film with a plurality of series of pictures on it, the series of pictures extending longitudinally of the film. As an example of the general class of film to which I refer I will mention a film on which there is a plurality of series of pictures, the pictures of each series being spaced apart so that adjoining series overlap or mesh together, each series including a plurality of pictures taken simultaneously and adapted to be projected simultaneously. In practice it is advantageous in such a film to arrange the pictures of each series so that they are spaced apart distances equal to a single picture area and to arrange adjacent series of pictures so that they are meshed together to completely occupy all the available picture area of the film. In practice a film such as I have just referred to presents many practical and noteworthy advantages in the production of colored motion pictures. However, this film has a difficulty which has been found to be very serious, namely the film shrinks and stretches so that there is considerable variation from time to time in a single film in the actual distance between the end pictures of each series, and with known types of film handling mechanism it is practically impossible to handle such film to get the pictures all in accurate position on the film with reference to the standard perforations in the film. For example, a standard perforated film passed through an ordinary type of camera that would simultaneously expose three picture areas spaced longitudinally on the film, will operate to hold one point or perforation in the film in a definite position with reference to the exposure apertures, while all other parts or perforations in the film will bear relation to the said point depending upon the condition of the film at the particular time the exposure is made. For instance, if a film is held so that a sprocket hole at the center picture of a series is in a definite position, the sprocket holes at the other pictures of the series will not be in a definite position with reference to the exposure apertures through which said other pictures are taken. The discrepancy or variations between the shrinkage of the film is actually slight. However, when the film is projected any such variation is magnified in proportion as the picture on the film is enlarged and actually results in imperfect register of the projected pictures. It is of course true that such discrepancies or variations might be compensated for by making adjustments in the projection mechanism at frequent intervals during projection, however, such operation is obviously not practical commonly.

It is an object of my invention to provide means for simultaneously obtaining a plurality of pictures along a film with each picture in a definite relation to the film perforations opposite it.

Another object of my invention is to provide a film handling device for holding a standard type of motion picture film in position for exposure with several spaced parts held accurately in definite predetermined positions.

It is a further object of my present invention to provide a film handling mechanism of the character above mentioned which involves a single member for advancing the film and holding it in the manner described.

The various objects and features of my present invention will be best and more fully understood from a typical preferred form of the invention throughout which description reference is had to the accompanying drawings, in which:

Fig. 1 is a sectional view of a camera embodying the construction provided by this invention;

Fig. 2 is an enlarged sectional view taken as indicated by line 2—2 on Fig. 1;

Fig. 3 is an enlarged view taken as indicated by line 3—3 on Fig. 1;

Fig. 4 is a sectional view taken as indicated by line 4—4 on Fig. 2;

Figs. 5 and 6 show other forms of film handling means, embodying my invention.

My invention in its broader applications may be applied, generally, to motion picture apparatus, for instance, cameras, projectors, etc., and may be employed in carrying out or in handling processes or films of various natures. I will, for purpose of explanation, describe my invention as applied to a camera for taking motion pictures and will set forth only typical embodiments of the invention designed to handle film of standard form. The film to be handled will be considered standard film in matters of size, marginal perforations (sprocket holes), etc.

The specific mechanism set forth in Figs. 1 to 4 of the drawings is designed to simultaneously expose three picture areas of the film spaced apart longitudinally on the film distances equal to one picture area. The camera is operable to advance the film between successive exposures so that the finished film carries a plurality of series of pictures in which adjacent series are meshed so that the entire available picture area of the film is occupied. It is to be understood that the specific explanation that I present is for the purpose of setting forth the principles of my invention and that various changes and modifications such as may suggest themselves in applying the invention to particular cases may be made without departing from the spirit of the invention.

Referring to Figs. 1 to 4 of the drawings I have shown a camera including, generally, an optical system 10, a film handling mechanism 11, a movement mechanism 12, a shutter 13, and various other parts.

The film handling mechanism 11 provided by my invention includes three film carrying plates 15, 16 and 17, film gates 18 for guiding the film over the plates, and means for advancing the film with reference to the plates and holding it in definite position with reference to the plates during the periods of exposure. The means just mentioned is preferably in the form of a wheel 20 provided with two series of sprocket teeth 19 so that it is in the form of a film sprocket. A sprocket wheel 20 is adapted to be intermittently rotated a definite amount from or by means of the movement mechanism 12. The drive between the movement mechanism and sprocket wheel may be of any suitable character, for instance, I have shown a gear drive between the shaft of the movement mechanism and the sprocket wheel. The film plates 15, 16, and 17, are tangentially disposed around the sprocket 20 and are provided with openings or slots 22 to pass the teeth 19 of the sprocket wheel so that they project from the faces of the plates in a manner to operatively engage the film at the plates. The plates are flat and each one is preferably slightly larger in area than a picture area of the film. The plates may be formed as a unit, may be joined together, or they may be individually mounted on a suitable frame part 25 as shown in the drawings. With this arrangement and relationing of the film plates and sprocket wheel the teeth of the sprocket operate to hold the film in definite position at each film plate and when the sprocket is rotated the film is moved in perfect synchronism at the several plates. In order that the film may be held by the sprocket teeth in a definite predetermined position at each film plate and in order that the condition of the film at the time it is exposed will not influence the positioning of the film at the several film plates I provide for the film being free between plates in a manner so that the position of the film at one plate is not influenced by the position of the film at the other plates. I accomplish this by spacing the plates around the sprocket wheel so that there is a slight loop of the film at A outward from the sprocket wheel as it passes from one film plate to the next. The looped parts A of the film are free of the sprocket teeth 19. In the specific application shown in the drawings, where there is a single picture area on the film between the picture area held at the film plates, the relationing of the parts is such that there are four film perforations out of engagement with the sprocket teeth between adjacent film plates, while there are three sprocket teeth out of engagement with the film between adjacent film plates. This necessarily causes an outward bulging or looping of the film at A as shown in the drawings. With the film held and moved at the several film plates by the same sprocket the loop parts A in the film remain the same at all times except for slight variation from time to time occuring in the size or extent of the loops caused by shrinkage or expansion of the film. The film gates 18 may be of any suitable construction which will operate to properly hold the film parts at the film plates allowing the film to pass or slide over the film plates and allowing the loop parts A of the film to be free as shown in the drawings. In the case shown in the drawings the optical system is at the exterior of the sprocket wheel so therefore the gates 18 are provided with apertures 30 through which the film is exposed.

The optical system provided by my invention operates to direct light entering the camera through a single aperture onto the film at the three film plates to obtain three exposures of the film simultaneously. The light which enters the optical system passes through an aperture 31 in the case 32 of the camera. The optical system may include a first light divider 33 arranged in the path of the light entering through the aperture 31 to pass part of the light and reflect off the balance onto a reflector 34 which directs it onto the film at film plate 17, a second light divider 35 which is in the path of light passed by the first light divider and which operates to pass part of the light and reflect off the balance onto a reflector 36 which directs it onto the film at the film plate 16, and a reflector 37 arranged in the path of light passed by the divider 35 to reflect it onto the film at the film plate 15. Suitable lens devices 40 are interposed between the reflectors 34, 36, and 37, so that the light is directed onto the film to obtain the desired images. It is to be noted that the various light dividers and reflectors just mentioned are positioned and related with reference to the film plates so that the shafts of light passing from the lens devices onto the film are at right angles to the plane of the film plates, or, in other words, extended radially with reference to the axis of the sprocket 20. It is also to be noted that my arrangement of reflectors and light dividers provides for the locationing of the lenses between the reflectors and dividers and the film in a manner which permits me to use standard lens necessary for practical motion picture photography. It will be obvious that suitable means may be incorporated in or applied to the optical system above described so that the three shafts of light falling on the film are different chromatically. For instance, the first light divider 33 may be such as to act as a yellow filter, the second light divider may be such as to act as a green filter. It is desirable to place a violet filter 60 in the path of light reflected from the light divider 33 and an orange filter 61 in the path of light reflected from divider 35. In this case the image obtained at the film plate 17 is of the violet values of the subject, the image obtained at the plate 16 is of the orange values of the subject, and the image obtained at the plate 15 is of the green values of the subject.

It will be obvious how the movement mechanism 12 will operate to intermittently rotate or advance the sprocket 20 so that the film is advanced through or past the film plates in a manner to obtain the proper exposures and how the shutter 13 may be operated through any suitable mechanism in proper synchronism with the movement mechanism so that the light is cut off from the film during the periods that the film is in movement.

In Fig. 5 I show another arrangement of film plates with reference to the sprocket wheel 70. In this case the plates 71 are preferably located ninety degrees apart around the wheel and therefore would require an optical system which would direct the shafts of light onto the film 72 at wider angles than are shown in Fig. 1.

In Fig. 6 I show an arrangement in which the film plates 73 are adjacent each other so that the exposures are made on adjacent areas on the film 74. Figs. 5 and 6 of the drawings will illustrate variations such as may be made in the film handling means.

Having described only a typical preferred form of my invention I do not wish to limit myself to the specific details set forth, but wish to reserve to myself any changes or variations that may appear to those skilled in the art or that may fall within the scope of the following claims.

Having described my invention I claim:

1. A film handling mechanism comprising a revoluble film actuating member, and a series of sequentially arranged film gates tangentially disposed relative to said actuating member and each having a picture aperture, the gates being positioned around the actuating member with the actuating member engaging the film at the picture apertures.

2. A film handling mechanism comprising a revoluble film actuating member, and a series of sequentially arranged spaced film gates each having a picture aperture and holding the film flat at the aperture, the gates being positioned around the actuating member with the actuating member engaging the film at the picture apertures.

3. A film handling mechanism comprising a film sprocket, and a series of sequentially arranged spaced film gates tangentially disposed relative to said sprocket, all of the gates being in the same cooperative relation with reference to the sprocket and the spaces between the film holding parts of adjacent film gates being clear allowing the film to have free loop parts.

4. A film handling mechanism comprising a revoluble film actuating member, a series of sequentially arranged film gates tangentially disposed relative to said actuating member, and an optical system including light dividing means disposed to direct the light separated by said light dividing means substantially perpendicular to the film gates.

5. A film handling mechanism comprising a revoluble film actuating member, a series of sequentially arranged spaced film gates tangentially disposed relative to said actuating member, and an optical system including light dividing means at the exterior of the actuating member and gates and disposed to direct the light separated by said light dividing means substantially perpendicular to the film gates.

6. In a cinematographic apparatus, a revoluble film actuating member, a series of sequentially arranged spaced film gates tangentially disposed relative to said actuating members, and an optical system receiving a single shaft of light and operatively associated with said film gates for directing light substantially perpendicular to the several film gates.

7. In a cinematographic apparatus, a revoluble film actuating member, a series of sequentially arranged film gates with picture apertures tangentially disposed relative to said actuating member to hold spaced parts of the film flat at the apertures, and with the film at the apertures in cooperative engagement with the actuating member, and an optical system operatively associated with said film gates for directing light radially with reference to the film actuating member.

8. A film handling mechanism comprising a revoluble actuating member, a series of sequentially arranged spaced film gates tangentially disposed relative to said actuating member, and an optical system including light dividing means disposed to direct the light separated by said light dividing means laterally onto the film at the film gates.

9. A film handling mechanism comprising a film sprocket, and a series of sequentially arranged film gates holding spaced parts of the film in cooperative engagement with the sprocket, adjacent gates being at angles of less than 180 degrees to each other around the sprocket and the mechanism allowing free loops of the film between adjacent gates.

10. A film handling mechanism comprising a film sprocket, and a series of sequentially arranged film gates each having a picture aperture and arranged in the same cooperative relation with reference to the sprocket with the sprocket engaging the film at the aperture, the mechanism allowing free loops of the film between adjacent gates.

In witness that I claim the foregoing I have hereunto subscribed my name this 30th day of August, 1926.

WALTER L. WRIGHT.